Figure 5:
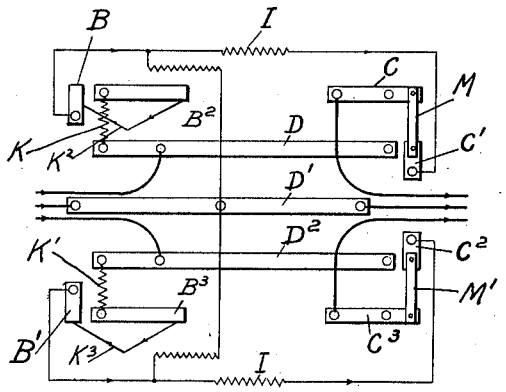

G. E. PALMER & W. E. McCOY.
SERVICE TERMINAL BLOCK.
APPLICATION FILED JAN. 22, 1910.
993,098.
Patented May 23, 1911.
4 SHEETS—SHEET 1.
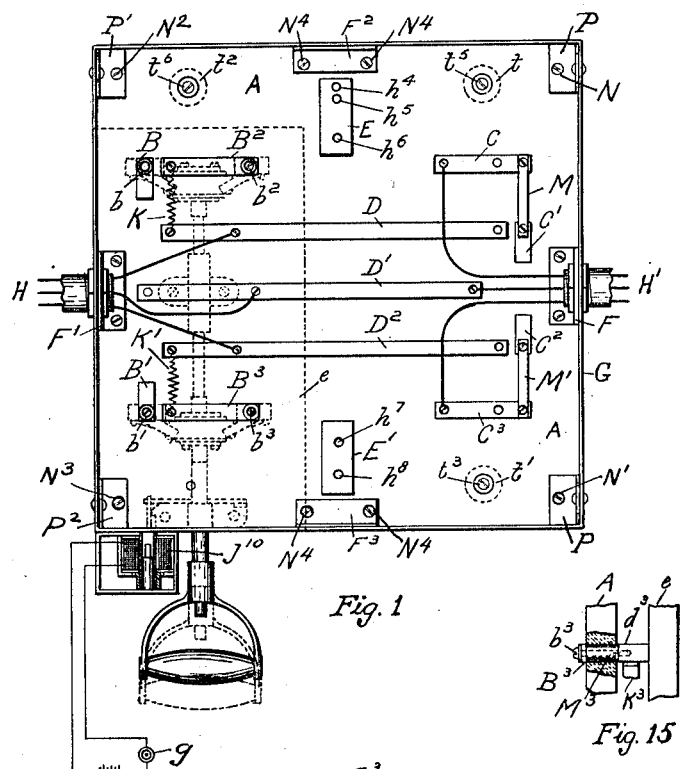
Fig. 1
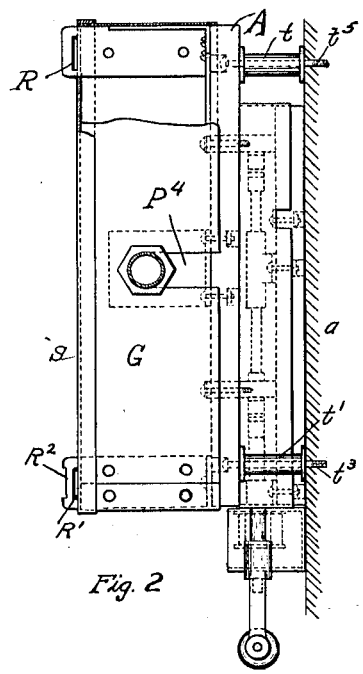
Fig. 2
Fig. 15
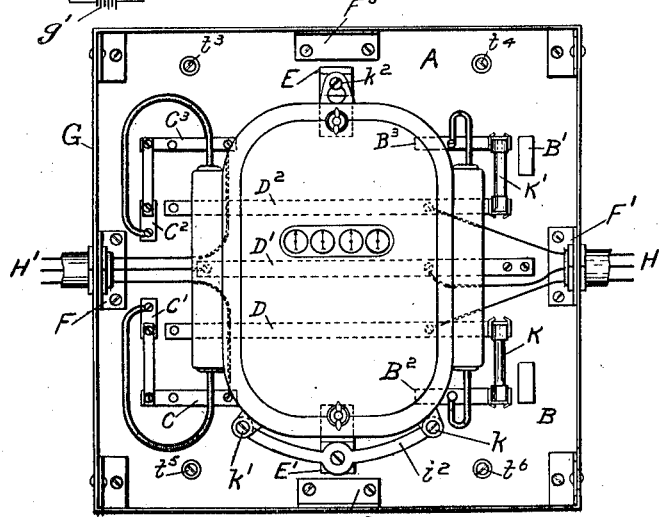
Fig. 3
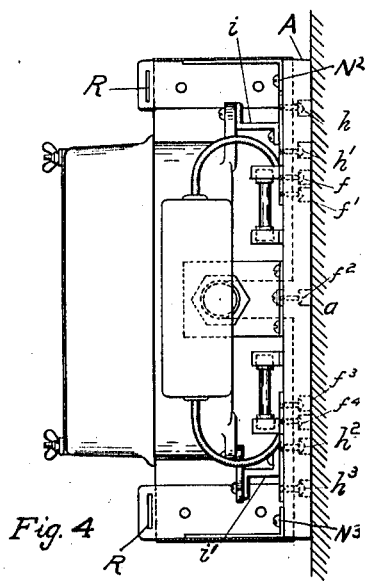
Fig. 4
WITNESSES:
Howard H. Haynes
Stanley C. Williams
INVENTORS
WALTER E. McCOY,
GRANVILLE E. PALMER
BY
Howson and Howson
Their ATTORNEYS G. E. PALMER & W. E. McCOY.
SERVICE TERMINAL BLOCK.
APPLICATION FILED JAN. 22, 1910.

993,098.

Patented May 23, 1911.

WITNESSES:

INVENTORS
WALTER E. McCOY,
GRANVILLE E. PALMER
BY
ATTORNEYS

G. E. PALMER & W. E. McCOY.
SERVICE TERMINAL BLOCK.
APPLICATION FILED JAN. 22, 1910.

993,098.

Patented May 23, 1911.
4 SHEETS—SHEET 3.

WITNESSES:
Howard H. Haynes
Stanley C. Williams.

INVENTORS
WALTER E. McCOY,
GRANVILLE E. PALMER
BY
Howson and Howson
Their ATTORNEYS G. E. PALMER & W. E. McCOY.
SERVICE TERMINAL BLOCK.
APPLICATION FILED JAN. 22, 1910.

993,098.

Patented May 23, 1911.
4 SHEETS—SHEET 4.

WITNESSES:
Howard H Haynes.
Stanley C. Williams.

INVENTORS
WALTER E. McCOY
GRANVILLE E. PALMER
BY
Howson and Howson
their ATTORNEYS

UNITED STATES PATENT OFFICE.

GRANVILLE E. PALMER, OF BOSTON, MASSACHUSETTS, AND WALTER E. McCOY, OF NEW YORK, N. Y.

SERVICE TERMINAL BLOCK.

993,098.  Specification of Letters Patent.  Patented May 23, 1911.

Application filed January 22, 1910. Serial No. 539,580.

*To all whom it may concern:*

Be it known that we, GRANVILLE E. PALMER and WALTER E. MCCOY, both citizens of the United States of America, and residing in the city of Boston, in the county of Suffolk, in the State of Massachusetts, and residing in the city, county, and State of New York, respectively, have invented certain new and Improved Service Terminal Blocks, of which the following is a specification.

Our invention relates to service terminal blocks and the object of our invention is to provide means for connecting the street, or line wires of an electric light or power circuit with the house wires of a building, so as to include in one device, a service fuse, a service switch, and a location for a meter; the service switch being so arranged that it may be incorporated into either the house circuit or into a test circuit passing through the meter and other instruments intended to determine the accuracy of said meter. When said switch is in said test circuit, the house circuit is not interrupted, means being provided to properly connect and fuse the house circuit while test is being conducted.

Having particular reference to a system which leads the street wires into a building in a duct or tube, our invention includes provision for the proper termination and support of the duct or tube.

It also includes the provision of means for terminating line and house wires in a safe electrical and practical mechanical arrangement, comprising a service fuse or fuses, a service switch and connections for a device for measuring the amount of electric current passing through these wires. These connections are so arranged that the measuring device may be tested, removed or replaced without interrupting the customer's use of current; and so that the service switch may be removed or replaced without interfering with the customer's use of current; and further so that in the event of one of the fuses blowing in a three-wire service, the said fuse may be replaced without endangering the operator or interrupting the customers use of current on the other side of the three-wire service. These connections are further arranged so as to enable the line and house wires to be connected to them when approaching from any direction without crossing; and means by which it is possible to always have the line wires pass through the fuses and the switch before they do the measuring device, without any wires being crossed, no matter from what direction the line and house wires approach the meter, nor whether the line wires enter the meter from its left or right side.

The fuses, switch, and measuring device are arranged in such combination that the switch is available as a main service switch to disconnect the street wires from the house wires. It may also be used to enable the operator to replace a fuse in one side of a three-wire circuit without handling wires liable to produce an arc resulting from the existence of the conditions that originally caused the fuse to blow, while, at the same time, the other side of the three-wire circuit may be caused to remain in an operative condition.

Means are further provided that, in the event of it being desirable to test the measuring device, the customer's circuit need not be interrupted, though, during the said test, it is properly fused. In making a test the switch becomes a part of the test circuit, the operator being able to manipulate it so that the meter and all of the test circuit are entirely "dead" until the test connections are completed, when they may be controlled by the switch without the operation of the switch affecting the customer's or working circuit.

Figure 11:
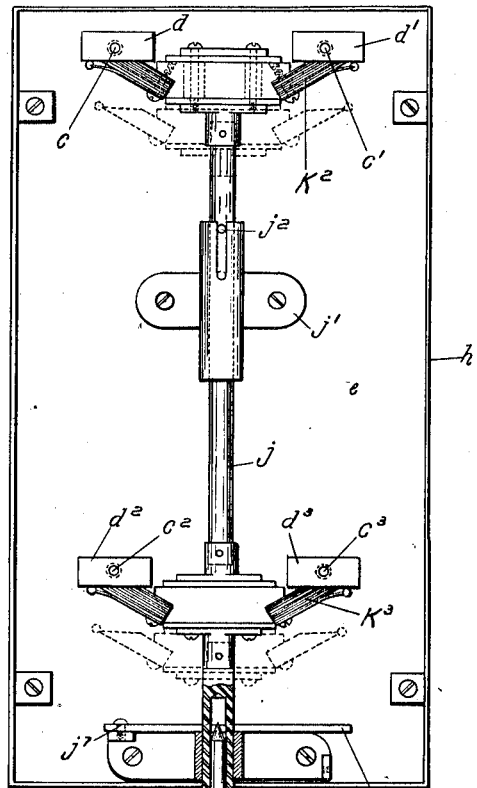
Figure 12:
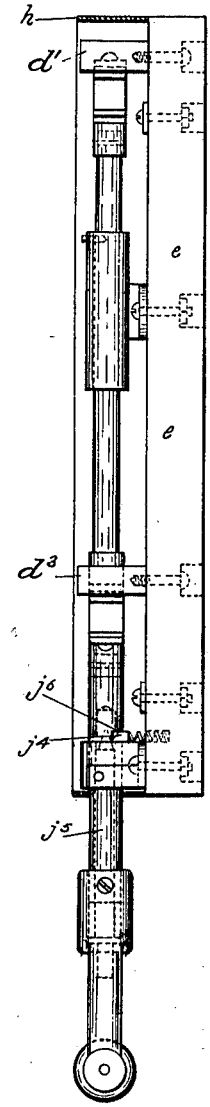
Figure 14:
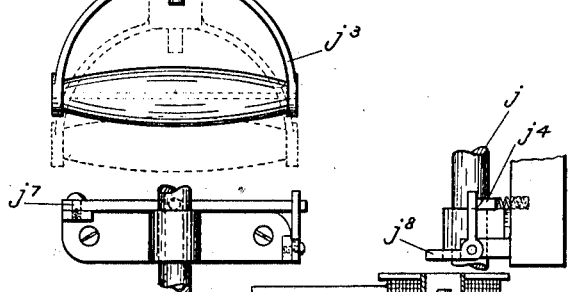
Figure 13:
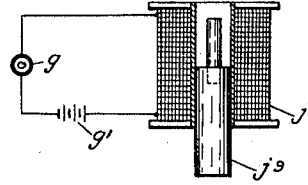
Figure 16:
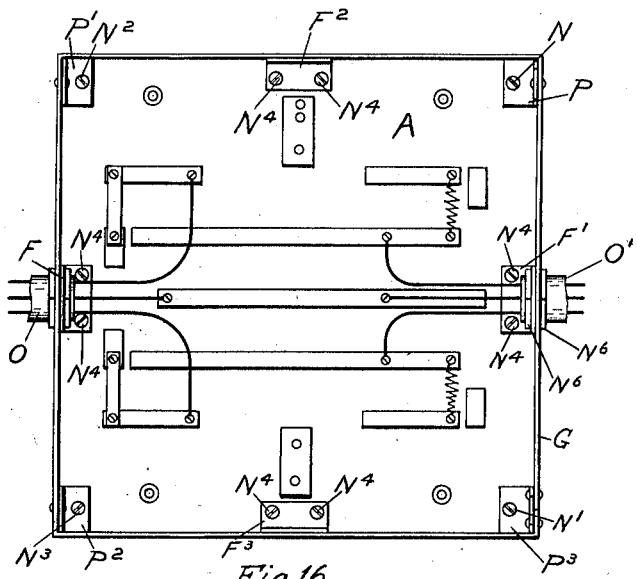
Figure 17:
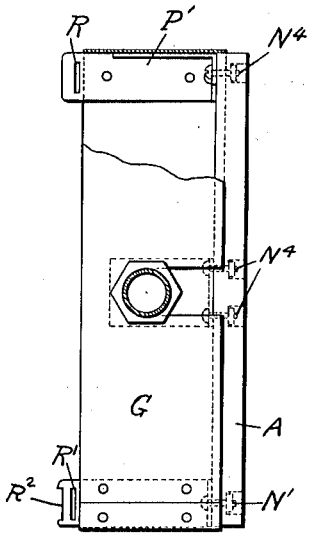
Figure 18:
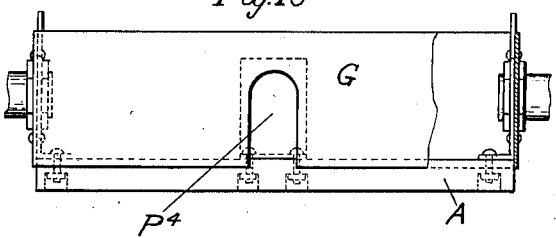
Figure 19:
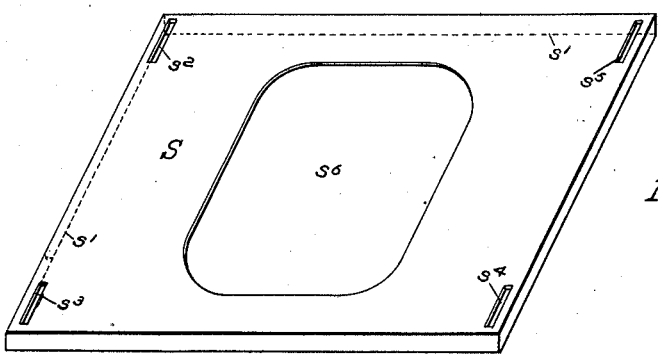
Figure 21:
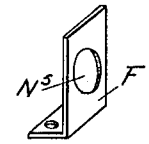
Figure 20:
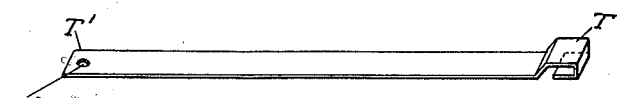

In the accompanying drawings in which our invention is shown embodied in our form, Figure 1 is a plan of the terminal block with cover removed; Fig. 2 is a side elevation of same with cover adjusted; Fig. 3 is a plan similar to Fig. 1 but showing with the block reversed and a meter in position; Fig. 4 is a side elevation of the same; Figs. 5 to 10 inclusive are diagrammatic plans of various connections through the block; Fig. 11 is a plan view of the switch partly in section; Fig. 12 is a side elevation of the same; Fig. 13 is a broken side elevation of a supplementary switch actuating device; Fig. 14 is a broken plan of portion of the switch; Fig. 15 is a broken side elevation of a detail of construction, partly in section; Fig. 16 is a plan of the block without the switch; Fig. 17 is a side elevation with the sides of the casing adjusted and partly in section; Fig. 18 is a similar view at right angles thereto; Fig. 19 is a perspective of the cover; Fig. 20 is a perspective of the locking bar; and Fig. 21 is a perspective of a detail.

The device in the form shown comprises a terminal base or block A to which are attached the terminals D, $D^1$, $D^2$ for the line and C, $D^1$, $C^3$ for the load wires, and the fuses K, $K^1$. It is further provided with openings for screws b—b'—$b^2$—$b^3$ by which the switch may be attached, the switch not necessarily being a part of the equipment, but may be attached or detached while the terminal block with its connections are in service, without in any way affecting the operation of said service.

The terminal block is provided with a box G, cover S, and conduit supports F, $F^1$, $F^2$, $F^3$, the conduit supports being so arranged that they may be placed on either opposite sides or ends of the box, or on any end or side, so as to provide an entrance for the conduit, containing the service or load wires, approaching from any direction. The sides of the block are arranged with angle corner posts P, $P^1$, $P^2$, $P^3$ and provided with a U-shaped opening $P^4$ in each side; these U-shaped openings being so arranged as to register with the conduit as supported by the conduit supports. The corner posts are secured to the slate base by means of screws passing through holes on the face of the base, and engaging in nuts in a countersunk portion of said holes, these nuts being held in place by sealing wax or other suitable cement so as to enable the posts of the inclosing box to be detached and removed from the base in order to enable the ready manipulation of the connecting wires for either installation, test, or replacement of the meter. The corner posts project beyond the upper edge of the side of the box and are provided with slots.

The cover S of the box consists of a metal piece having slots that register with the projecting ends of the corner posts, and shackle bars T are provided which engage with the slots in the corner posts so as to secure the cover, and to permit its being sealed or locked in place.

As the terminal block is intended for use with all varieties of meters, it is further provided with adjustable means for supporting these various types of meters, so that by a change in the position of these supports, it is possible to arrange the block for use with any type of meter;—a suitable cover being provided for use with meters of different size or shape.

Having thus described in outline the features of this construction, we will now proceed to describe its mechanical details.

Referring to Fig. 1, on the base A, which is composed of slate or some other suitable non-conducting material, are mounted, by means of screws f, $f^1$, $f^2$, $f^3$, $f^4$, etc., (Figs. 1 and 4) the bus bar sections B, $B^1$, $B^2$, C, $C^1$, $C^2$ and $C^3$, D, $D^1$ and $D^2$; the meter supporting straps E and $E^1$; the conduit supporting clips F and $F^1$; and the inclosing box G. The sections D, $D^1$ $D^2$ are extended and protrude on each side of the meter when placed over them. The sections B, $B^1$ $C^1$ $C^2$ are shorter and adjacent to the ends of the extended sections D, $D^2$. The sections $B^2$ $B^3$ C $C^3$ are additional sections and adjacent respectively to the shorter sections B $B^1$ $C^1$ $C^2$ and the sections D $D^2$ so as to be easily electrically connected thereto as hereinafter described. The three line wires are indicated as H, and the three house wires as $H^1$, the representation showing a three-wire or a polyphase service. In a two-wire service the bus bar $D^1$ and the line and house wires attached to it are omitted.

Referring to Figs. 5, 6, 7, 8, 9 and 10, it will be seen that the line wires, as indicated by the arrows as approaching the block, and the house wires, as indicated by the arrows as leaving the block, may approach from either direction without crossing; the line wires always attaching to bus bars D, $D^1$ $D^2$, and the house wires always attaching to C, $D^1$ and $C^3$. In Figs. 5, 6, 7, 8, 9 and 10 the series coils of the meter, which are indicated jointly as I, are attached to the bus bars B and $B^1$, and $C^1$ and $C^2$ under all arrangements.

In Fig. 5 one incoming conductor is connected to the plate D from which the circuit passes through the fuse K to plate $B^2$, switch arm $K^2$, plate B, the upper meter coil I, plate $C^1$, strap M, plate C to an outgoing conductor. Another incoming conductor is connected to the plate $D^2$ from which the circuit is through the fuse $K^1$, plate $B^3$, switch arm $K^3$, plate $B^1$, lower meter coil I, plate $C^2$, strap $M^1$, plate $C^3$ to an outgoing conductor. The third incoming conductor is connected to one end of the plate $D^1$ through which the circuit goes directly to the outgoing conductor connected to its other end. The description of circuits just given applies equally well to the arrangement shown in Figs. 6, 7 and 8.

Figure 6:
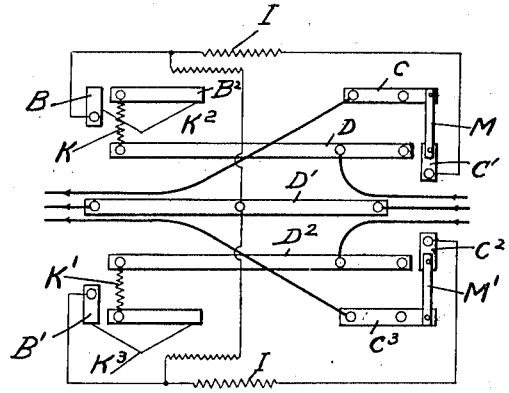
Figure 7:
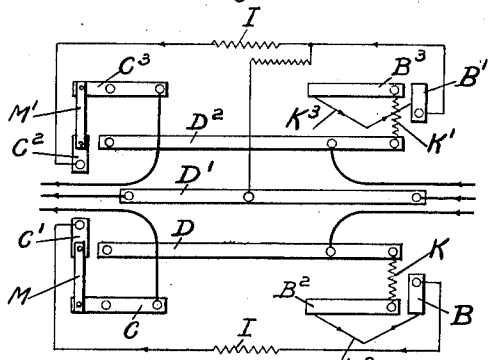
Figure 8:
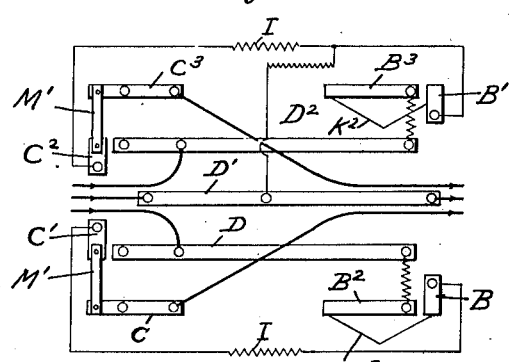

Figs. 5 and 6 indicate the connections in which the wires approaching from either the left or right connect through the fuses, diagrammatically illustrated, K and $K^1$; the movable switch members $K^2$ and $K^3$, and the series coils of the meter, when said coils should have their left hand terminals connected to line and their right hand terminals connected to load; and Figs. 7 and 8 indicate how line wires and load wires approaching from either direction are taken through fuses K and K¹, and the movable switch members K² and K³, and the series coils of the meter, when said coils should have their right hand terminals attached to line, and their left hand terminals attached to load.

Figure 9:
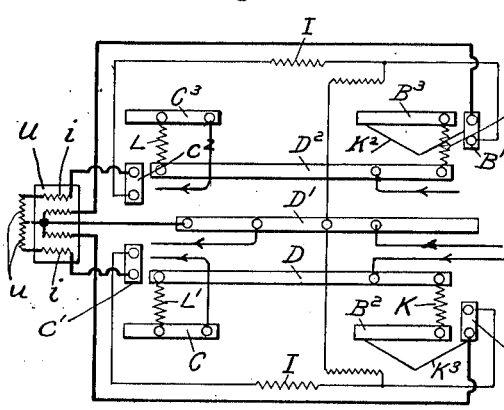
Figure 10:
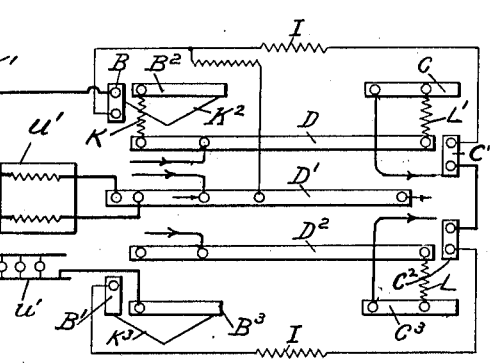

Figs. 9 and 10 indicate that by placing fuses L and L¹ so as to connect the points D² and C³ and D and C respectively, it is possible to by-pass the series coils of the meter, remove the connecting straps M and M¹, Figs. 6 and 7, open the switch that connects B with B², and B¹ and B³ without having interrupted the customer's use of current, or, if for example, a fuse K, Fig. 7, is blown, it is possible to insert a fuse between C³ and D², open the movable switch members K² and K³ without interrupting the current supplied through the bus bars D¹ and D², insert a fuse K between D and B², and close the movable switch members K² and K³ without having the danger of fuse K blowing while the operator's hands are in contact with same, or interrupting the current supplied to the customer through the bus bars D¹ and D².

Fig. 9 shows the block with a standard polyphase testing instrument U with artificial load $u$ connected thereto, the conductors leading from the standard instrument being shown in heavy lines, its series coils being connected to the terminal plates C¹—C² and the shunt coils being connected to the terminal plates B—B¹.

Fig. 10 shows a standard single-phase testing instrument U¹ with artificial load $u^1$ connected to the block when used in connection with a single-phase circuit. In this case the series circuit of the standard instrument including the artificial load $u^1$ is connected between the plates D¹ and B³ and the shunt circuit is connected between the plates D¹ and B, the plates C¹ and C² being also electrically connected so as to put the two coils of the service meter in series.

When testing as either in Figs. 9 or 10, the straps M—M¹ are both removed and fuses L—L¹ inserted. When the standard meters are connected as shown, the service is still maintained during the connecting in of the standard instrument and the test of the service meter and the circuits through the service meter and testing instrument are subject to control by the switch which is entirely cut out of the service circuits. When the fuses L—L¹ are inserted and the straps M—M¹ removed, and a testing instrument inserted as in Figs. 9 and 10, the circuits to the house service are direct from the incoming leads through the conductors D—D¹—D² to the outgoing leads. In Fig. 9 the circuits through the service meter and the standard meter in series beginning with the conductor D, are through fuse K, plate B², switch arm K³, plate B, lower coil I, plate C¹, lower series coil $i$ of standard meter, artificial load $u$ to conductor D¹, and beginning with conductor D² through fuse K¹, plate B³, switch arm K², plate B¹, upper meter coil I, plate C², upper series coil $i$ of standard meter, artificial load $u$ to conductor D¹. The shunt coils of standard are conductor D¹ and plates C—C¹.

In Fig. 10, during the meter test the plates C¹—C² are connected by a conductor to put the two coils I—I in series, and the fuse K¹ removed. The circuit through the service meter and the standard meter is then as follows: Conductor D, fuse K, plate B², switch arm K², plate B, upper series coils I, plates C¹—C², lower series coil I, plate B¹, switch arm K³, plate B³, load $u^1$, series coil $i^1$ of standard meter to conductor D¹. The shunt coil of the standard is connected to conductor D¹ and plate B.

Figs. 1, 2, 11 and 12 show the method of attaching or detaching the switch shown in Fig. 11, from the terminal block shown in Fig. 1. The terminal block is supported from the wall, $a$, by the posts $t$, $t^1$ and $t^2$. The bus bar sections B, B², B¹ and B³ are located so that a conductor stud M³, Fig. 15, passes through a hole in the slate A, so as to electrically engage the faces of B, B¹, B², B³. These bus bar sections, B, B², B¹ and B³ are drilled so as to allow screws $b$, $b^2$, $b^1$ and $b^3$ to pass through the bars, through the contact stud M³, Fig. 15, and engage in the threaded holes $c$, $c^1$, $c^2$, $c^3$ in the fixed contact blocks, $d$, $d^1$, $d^2$, $d^3$ of Fig. 11 as shown in connection with $d^3$ in Fig. 15.

The switch illustrated in Figs. 11 and 12, is mounted on a base $e$, and consists of the fixed contact members $d$, $d^1$, $d^2$, $d^3$ and movable contact members K² and K³. These movable contact members are in operative relation with but insulated from the operating rod $j$, which moves in a guide $j^1$, having a limit stop $j^2$, engaging in the slot of the guide $j^1$. The operating rod is provided with a handle $j^3$ and spring pressed locking bar $j^4$, and a spring returned release trigger $j^5$. The spring lock bar engages in a notch $j^6$ of the operating bar $j$. The spring lock bar is provided with a pivot $j^7$, Fig. 14, and also may be provided with a supplementary releasing dog $j^8$ in operative relation with the armature $j^9$ on the solenoid $j^{10}$, Figs. 1 and 13.

The switch stands in a vertical position, and, if the handle is pushed upward until the movable contacts K² and K³ come into proper relation with the fixed contacts $d$, $d^1$, $d^2$, $d^3$, the locking bar $j^4$ engages in the notch $j^6$ and holds the switch in a closed position. By pressing the extended end of the release trigger $j^5$, its upper end moves the locking bar $j^4$ out of engagement with the notch $j^6$, and allows the switch to open by gravity; or if the push button $g$ (Fig. 13) is operated so as to cause the solenoid $j^{10}$ to be energized by the battery $g^1$ or other source of electrical current, the armature $j^9$ comes into such relation with the pawl $j^8$ that the locking bar $j^4$ is released from engagement with the notch $j^6$ allowing the switch to open by gravity.

It will be readily seen by comparing Figs. 1 and 11 that the opening and closing of the switch interrupts the working circuit when connected as shown in Fig. 5, and controls the test circuit when connected as shown in Figs. 9 and 10.

As the holes in the bus bar sections B, $B^1$, $B^2$, $B^3$ are symmetrically located with reference to one another, and as the fixed contact switch members $d$, $d^1$, $d^2$, $d^3$ are also symmetrically located, the terminal block may be erected so that the bus bar terminals B, $B^2$, $B^1$, $B^3$ are on the left hand side of the block with the switch as shown in Fig. 1, or the terminal block may be so erected that the bus bar terminals B, $B^2$, $B^1$, $B^3$ are on the right hand side of the block as shown in Fig. 7, and permits of the switch being located under the right instead of under the left hand side of the block; thus making it possible to have the fuse and switch always come on the line side of the measuring device.

The connection stud $M^3$ shown in Fig. 15, is sufficiently long to extend entirely through the base A, so that a screw passing through the clearance hole with which it is provided and engaging the fixed contacts of the switch draws it into close electrical connection with the fixed terminal contacts $d$, $d^1$, $d^2$ and $d^3$ and the bus bar sections B, $B^1$, $B^2$ and $B^3$.

The switch shown in Fig. 11 is provided with inclosing sides $G^1$, composed of metal or other suitable material, of such height that when the switch is placed in the position shown in Fig. 2, all of its parts which carry current are inclosed, as the base of the terminal block covers its open side.

To the base A are secured the supporting straps E, $E^1$ by the screws $h$, $h^1$, $h^2$, $h^3$. These straps are provided with threaded holes $h^4$, $h^5$, $h^6$, $h^7$, $h^8$. Two angle pieces $i$, $i^1$ and strap $i^2$ are provided suitably arranged for attachment to the meter by screws, and in turn to the supporting straps E and $E^1$. The angle pieces $i$ and $i^1$, and the strap $i^2$ are capable of being placed in a sufficient number of positions so as to register with the screw holes $k$, $k^1$, and $k^2$ which occur on standard meters in different relative positions.

Figs. 16, 17 and 18, illustrate the method of terminating the conduit on the block A. Conduit supports as shown in Fig. 21 are mounted on the base A by the screws $N^4$; the base A being drilled and countersunk to permit of the use of nuts on the lower side of the block. These nuts are held in place by a suitable cement so as to enable the screws $N^4$ being removed. There are four conduit supports on each block, two of which are supplied with the hole $N^5$ that permits the entrance of the conduit O, and of its being clamped to its supports by the check nuts $N^6$. The sides of the inclosing case, shown in Figs. 16, 17 and 18 are of sheet metal or other suitable material, bent into shape so as to snugly inclose the base A, and are held in position by angle pieces P, $P^1$, $P^2$ and $P^3$ which are secured to the base A by screws and nuts N, $N^1$, $N^2$, $N^3$ engaging in the base A.

The box G is provided on each of its four sides with a U-shaped notch $P^4$. These notches are made so that they register with the conduit O, and its supports, and the box is clamped to the conduit supports by one of the lock nuts $N^6$ at each conduit entrance. As it is usually not desirable to have more than two conduit entrances on the block, and as it may be desirable to enter or leave the block from any direction, G is notched on each of its four sides. The blank conduit supports $F^2$ and $F^3$ are not provided with the hole $N^5$, simply acting as a cover to the blank holes in the two unused sides of G. The angle pieces P—$P^1$—$P^2$—$P^3$ extend above G as shown in Fig. 17, and are provided with slots. P and $P^3$ each have a slot and notch similar to $R^1$ $R^2$; and $P^1$ and $P^2$ each have slots similar to R.

The cover S, shown in Fig. 19 has a flange $s^1$ and slots $s^2$, $s^3$, $s^4$ and $s^5$. This cover S fits down over G, its flange extending on the outside of G, and the slots $s^2$, $s^3$, $s^4$, $s^5$ registering with $P^1$, $P^2$, $P^3$, P respectively. The hole $s^6$ in the cover S allows the meter to project through it. As meters vary in their contour it is necessary that covers having different shaped holes $s^6$ be provided for the different shapes and sizes of meters.

To remove the box G, the nuts $N^6$ clamping it to two of the conduit supports are loosened. The screws N—$N^1$—$N^2$—$N^3$ are then removed. The box G is now unrestrained and can be lifted off without disturbing the conduit supports or the contacts upon the connection block, the slots $P^4$ permitting it to be removed without disturbing the conduits.

The ends of the angle pieces P, $P^1$, $P^2$ and $P^3$ extend through the cover S, when it is in place, (see Fig. 2) far enough to allow two shackle bars, both identically the same as shown in Fig. 20, to be engaged with the slots of these angle pieces,—the end of the shackle bar T engages with the notched and slotted section $R^1$, and the end $T^1$ of the bar, engages with the single-slotted angle piece, securing the cover S into place. The end, T¹, of the shackle bar extends through the slot R a sufficient distance to permit a seal or lock being engaged with the hole T² in order to prevent its removal, which would allow in turn the removal of the cover S, and access to the live terminals of the block.

While we have thus described with particularity a construction well adapted to afford the advantages pointed out, our invention may readily be incorporated in structures of modified form and we do not limit ourselves to the details shown.

We claim as our invention:

1. A service terminal block comprising a fuse, a switch and a current measuring device, through all of which the connection between the line and load circuit may be established and means in connection with said block for establishing a fused by-pass around said switch fuse and measuring device so that either device may be entirely removed during the uninterrupted continuity of the service connection.

2. In a connection block, the combination of an extended bus bar section, two shorter bus bar sections adjacent to the ends of said extended sections, two additional bus bar sections adjacent to said shorter terminal sections and their adjacent extended sections, a switch arm connecting one additional section and its adjacent shorter section, a fuse connecting said last mentioned additional section and said extended section, a conductor connecting the other additional section and its adjacent shorter section, and an insulating base on which said sections are mounted.

3. In a connection block, the combination of an extended bus bar section, two shorter bus bar sections adjacent to the ends of said extended sections, two additional bus bar sections adjacent to said two shorter sections, respectively and to their adjacent extended section, a switch arm connecting one additional section and its adjacent shorter section, a conductor connecting said last mentioned additional section and said extended section, a removable conductor connecting the other additional section and its adjacent shorter section, said other additional section being adapted to be electrically connected to said extended section, and an insulating base on which said sections are mounted.

4. In a connection block, the combination of an extended bus bar section, two shorter bus bar sections adjacent to said extended sections, two additional bus bar sections adjacent to said two shorter sections and their adjacent extended section, a switch arm connecting one additional section and its adjacent shorter section, a conductor connecting said last mentioned additional section and said extended section, a conductor connecting the other additional section and its adjacent shorter section, and an insulating base on which said sections are mounted, said sections being on the front face of said base and said switch arm being on the opposite face thereof.

5. In a connection block, the combination of two extended bus bar sections, four shorter bus bar sections mounted adjacent to the four ends thereof respectively, four additional bus bar sections mounted adjacent to the shorter sections respectively, switch arms connecting the shorter sections at one side with the additional sections at that side respectively, connections between said last mentioned additional sections and the corresponding ends of the extended sections respectively, and connections between the other additional sections and their adjacent shorter sections respectively, and an insulating base on which all of said sections are mounted.

6. In a connection block, the combination of two extended bus bar sections, four shorter bus bar sections mounted adjacent to the four ends thereof respectively, four additional bus bar sections mounted adjacent to the shorter sections respectively, switch arms connecting the shorter sections at one side with the additional sections at that side respectively, connections between said last mentioned additional sections and the corresponding ends of the extended sections respectively, and connections between the other additional sections and their adjacent shorter sections respectively, and a mechanical connection between said switch arms for actuating the same.

7. In a connection block, the combination of two extended bus bar sections, four shorter bus bar sections mounted adjacent to the four ends thereof respectively, four additional bus bar sections mounted adjacent to the shorter sections respectively, switch arms connecting the shorter sections at one side with the additional sections at that side, connections between said last mentioned additional sections and the corresponding ends of the extended sections, and connections between the other additional sections and their adjacent shorter sections respectively, an insulating base on which all of said sections are mounted, and a casing for said base and sections, said base being reversible relatively to its casing, and said switch arms being reversible relatively to said base.

8. In a connection block, the combination of two extended bus bar sections, four shorter bus bar sections mounted adjacent to the four ends thereof respectively, four additional bus bar sections mounted adjacent to the shorter sections respectively, switch contacts removably connected to the shorter sections at one side and the additional sections at that side, movable switch arms engaging said contacts, connections between said last mentioned additional sections and the corresponding ends of the extended sections, and connections between the other additional sections and their adjacent shorter sections respectively, an insulating base on which all of said sections are mounted, a casing for said base and sections, said base being reversible relatively to its casing, and said switch arms and contacts being reversible relatively to said base, and an independent backing to which said contacts and movable switch arms are secured.

9. In a connection block, the combination of two extended bus bar sections, four shorter bus bar sections mounted adjacent to the four ends thereof respectively, four additional bus bar sections mounted adjacent to the shorter sections respectively, switches having movable switch arms and two pairs of switch contacts connecting the shorter sections at one side with the additional sections at that side, connections between said last mentioned additional sections and the corresponding ends of the extended sections, connections between the other additional sections and their adjacent shorter sections respectively, an insulating base on which all of said sections are mounted, and a casing for said block and sections, said base being reversible relatively to its casing, and said switch arms being reversible relatively to said base, an independent backing for said switch to which its contacts and movable switch arms are secured, and means for removably connecting the additional sections secured to the extended sections and the shorter sections adjacent thereto to either pair of switch contacts, said switch arms and switch contacts being on the rear of said insulating base, and said sections being on the front face thereof.

10. In a connection block, the combination of two extended bus bar sections, four shorter bus bar sections mounted adjacent to the four ends thereof respectively, four additional bus bar sections mounted adjacent to the shorter sections respectively, a switch having two switch arms and two pairs of contacts connected to the shorter sections at one side of the block and the additional sections at that side, connections between said last mentioned additional sections and the corresponding ends of the extended sections, connections between the other additional sections and their adjacent shorter sections respectively, an insulating base on which all of said sections are mounted, a casing for said base and sections, said base being reversible relatively to its casing, and said switch being reversible relatively to said base, an independent backing on which said movable switch arms and contacts are mounted, and means for removably connecting the additional sections secured to the extended section and the shorter sections adjacent thereto to either pair of switch contacts, said switch arms and switch contacts being on the rear of said insulating block, and said sections being on the front face thereof, said switch arms being connected together and normally tending to move to open position, and means for holding the same in closed position.

11. In a connection block, the combination of two extended bus bar sections, four shorter bus bar sections mounted adjacent to the four ends thereof respectively, four additional bus bar sections mounted adjacent to the shorter sections respectively, switch arms connecting the shorter sections at one end of the block with the additional sections at that end, connections between said last mentioned additional sections and the corresponding ends of the extended sections and connections between the other additional sections and their adjacent shorter sections respectively, said last mentioned additional sections and their respectively adjacent extended sections being adapted to be electrically connected together, and a third extended bus bar section located between the said other extended sections.

12. In a meter connection block the combination of a line terminal, two switch contacts, a fuse connecting one of said contacts to said line terminal, the other contact being adapted to be connected to a meter conductor, a switch arm co-acting with said contacts, and together therewith constituting a switch, a load terminal adapted to be electrically connected with another meter conductor, and means for connecting said load terminal to said line terminal by a fuse, thereby by-passing said switch and first mentioned fuse and fusing the by-pass.

13. In a meter connection block the combination of a line terminal, two switch contacts, a fuse connecting one of said contacts to said line terminal, the other contact being adapted to be connected to a meter conductor, a switch arm co-acting with said contacts, and together therewith constituting a switch, a load terminal, a meter terminal adjacent to said load terminal, a removable conductor connecting said meter and load terminals, and means for connecting said load terminal to said line terminal by a fuse, thereby by-passing said switch and first mentioned fuse, and fusing the by-pass.

14. In a meter connection block the combination of a line terminal, two switch contacts, a fuse connecting one of said contacts to said line terminal, the other contact being adapted to be connected to a meter conductor, a switch arm co-acting with said contacts and together therewith constituting a switch, a load terminal, a meter terminal adjacent to said load terminal, a removable conductor connecting said meter and load terminals, and means for connecting said load terminal to said line terminal by a fuse, thereby by-passing said switch and first mentioned fuse, and fusing the by-pass, and a line and load terminal adjacent to said line terminal.

In testimony whereof we have signed our names to this specification, in the presence of two subscribing witnesses.

GRANVILLE E. PALMER.
WALTER E. McCOY.

Witnesses as to G. E. Palmer:
WILLIAM L. HATFIELD,
JOSEPH B. SMITH.

Witnesses as to Walter E. McCoy:
WALTER ABBE,
WILLIAM ABBE.